May 21, 1963 — L. BREWER — 3,090,196
ROCKET PROPELLENT
Filed Sept. 9, 1959
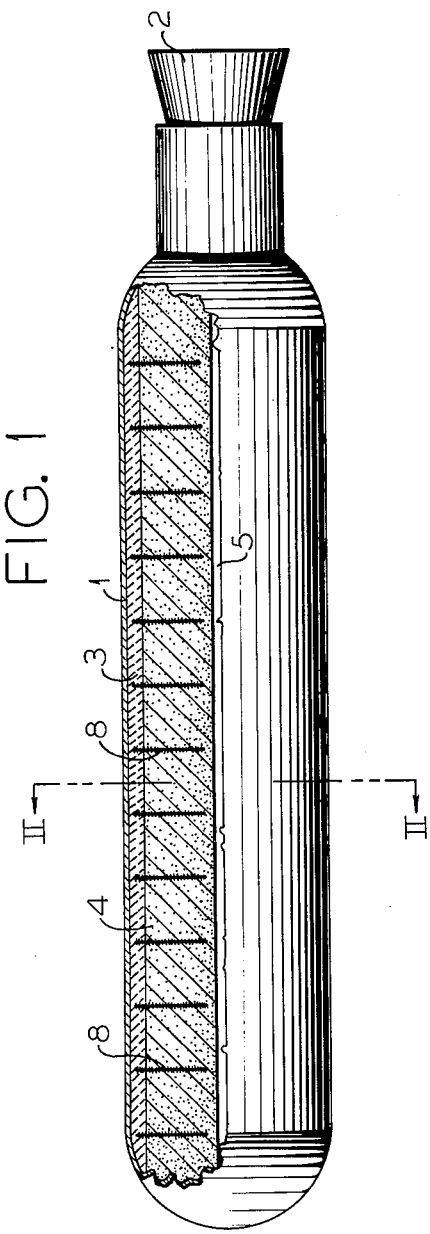
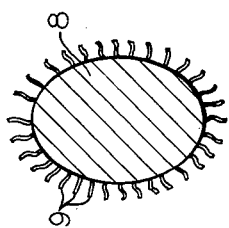
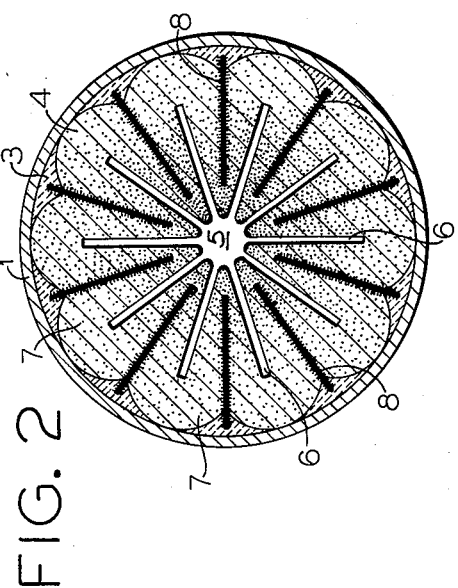
INVENTOR.
LEONARD BREWER
ATTORNEYS

United States Patent Office

3,090,196
Patented May 21, 1963

3,090,196
ROCKET PROPELLENT
Leonard Brewer, Herrin, Ill., assignor to Olin Mathieson Chemical Corporation, East Alton, Ill., a corporation of Virginia
Filed Sept. 9, 1959, Ser. No. 839,000
2 Claims. (Cl. 60—35.6)

This invention relates to rocket propellents and more particularly to large rocket motors or gas generating assemblies fueled with solid propellent charges Large rocket motors and gas generating assemblies are preferably prepared by casting a solid propellent charge into a cylindrical metallic casing. The solid propellent charges consist of a plastic matrix or binder of various organic synthetic rubber or plastic materials having a particulate oxidizing material together with suitable modifiers dispersed uniformly throughout its body. In order to increase and enhance the burning and ballistic characteristics of the propellent, it has been found advantageous in most instances to provide the propellent with a central perforation extending substantially throughout the length of the propellent grain. This perforation is the burning chamber of the rocket motor. The combustion of the propellent proceeds perpendicularly from the surface of the perforation. The burning surface of the propellent is dependent upon the area of the perforation. Thus, the burning surface can be readily increased by having several longitudinal radially extending slots or valleys in communication with the central perforation. Grains having this type of perforation are normally referred to as star point grains and their value has been recognized throughout the propellent industry.

In such star point grains, the several radial segments of thermosetting composite solid propellents are subject to cold flow during storage prior to use. This cold flow can so distort the propellent grain that its ballistic performance is impaired. In such an event, the entire propulsion unit must be rejected, causing not only monetary loss but also a possible disruption of military logistics. Prior to the advent of the present invention, the ratio of particulate solids to plastic fuel binder was increased to the point where the physical properties of the propellent were deteriorated in attempts to obtain optimum ballistic stability in case bonded solid propellent rocket engine charged with star point grains. Also, various attempts have been made to counteract the cold flow tendencies of this type of propellent by incorporating fibrous fillers, such as nylon tow or asbestos, in the plastic matrix to improve its dimensional stability. The incorporation of such materials results in dilution of the propellent charge and also seriously increases its ash content. Therefore, the design of star point solid propellent grains has been necessarily maintained within narrow limits and no completely satisfactory method of avoiding cold flow has heretofore been developed.

Therefore, it is an object of the present invention to provide a rocket motor or gas generating assembly having a star point solid propellent grain overcoming the disadvantages of the prior art. A more specific object of this invention is to provide a star point grain capable of withstanding prolonged storage without change in configuration due to cold flow. It is a further object of this invention to provide supporting means for composite solid propellent star point grains permitting greater flexibility in grain design.

In accordance with this invention, generally stated, these and other objects are accomplished by providing a star point solid propellent grain in a rocket motor or gas generator with supporting members positioned to prevent slumping or cold flow of the grain in storage. More specifically, this invention contemplates a rocket motor containing a solid propellent grain case in place with a multisided longitudinal perforation dividing the grain into a plurality of radial segments and one or more supporting members extending from the case laterally within the segments of the propellent grain but terminating intermediate the central perforation thereof.

The supporting members extending from the wall of the casing into the grain may be formed of any material that will not be dissolved in the matrix as the grain is cast and that does not have a heat conductivity substantially greater than that of the propellent itself. Thus, the supporting members have no deleterious effect upon the burning characteristics of the propellent grain. Fiber filled phenolic plastic resins are particularly well suited for use as the supporting members. While phenol formaldehyde and urea formaldehyde copolymers reinforced with fibrous material including glass, asbestos, nylon, and the like are preferred, any other commercially available plastics having similar low heat conductivity, resistance to combustion, and a favorable strenth-to-weight ratio can also be employed. Also, the supporting members can be formed of any suitable metal having an insulating coating of the materials indicated above. The supporting members are provided with a large number of spines extending from the surface thereof. The spines which can be straight or wavy rods affixed to the surface of the supports by bonding or by press fitting them into drilled holes, provide support for the cured propellent regardless of the position in which the grain is stored. The number of spines employed and their position can be modified to permit optimum flow about the supporting members during propellent casting. Likewise, the number of supporting members used and their spacing can be modified depending upon the dimensions and the configuration of the stellate central perforation in the grain. The cross sectional configuration of the supporting members must be such that they do not impede the flow of the propellent during the casting operation. While a generally elliptical or tear-drop cross section having a major axis substantially parallel to the longitudinal axis of the grain is preferred, various other cross sectional configurations, such as a diamond shape, can also be employed.

Rocket motors or gas generating assemblies containing a cast star point propellent grain are generally provided with means about the periphery of the grain to impart a generally fluted or corrugated surface to the grain. Such fluting provides the grain with a rosette cross-sectional configuration and tends to equalize the web of the grain between the star point perforaiton and periphery of the grain, thus eliminating a long tail-off or slow inefficient diminishing of power output. This fluted configuration is preferably obtained in accordance with the present invention by bonding arcuate inert slivers to the internal surface of the propellent casing prior to casting the propellent grain therein. Alternately, the casing itself may be longitudinally fluted and the inert slivers dispensed with.

The slivers or inert forms can be attached to the interior surface of the case wall by bonding with any suitable bonding material such as synthetic rubbers, epoxide adhesives, and the like. Also, they may be affixed to the wall by screws passing through the shell wall and a portion of the sliver. Any other conventional means of permanently positioning the inert forms can be employed. In any event, after the inert forms have been positioned in place along the interior wall of the shell case, it is preferred to coat them as well as any exposed surface of the casing wall with a liner that serves as an insulating coating and to bond the propellent charge to the slivers and case wall. The particular type of liner employed varies with the characteristics of the propellent to be charged into the rocket motor. For example, a thin layer of synthetic rubber or resinous plastic material could be polymerized in situ over the slivers or inert forms to serve as a bonding and insulating layer about propellent charges having similar types of matrices. The inert forms can be of any type of material that will not have any adverse effect on the ballistic properties of the gas generating material. Suitable materials include wood, solid or hollow metal extrusions, or fibrous reinforced synthetic plastic materials.

In those instances where the desired external configuration of the propellent grain does not require a case containing arcuate inert forms, the star point supporting members are attached directly to the internal surface of the cylindrical case wall by any suitable means. In the absence of the inert forms, however, it is preferred to utilize a series of clips or a narrow strip of wood or metal to serve as an anchoring means for the supporting members.

The star point supports can be attached to the inert forms or slivers by press fitting or potting them into holes formed in the sliver. The star point supports can also be screwed or cemented into holes in the inert slivers, or can be driven into the sliver in the same manner as a nail.

Any solid propellent or gas generating charge capable of being poured and cast in a casing can be employed in accordance with the present invention. Such composite propellent charges consist of particulate oxidizing agents and modifiers dispersed in a plastic matrix. Inorganic oxidizing agents, such as the perchlorates and nitrates of ammonium and potassium are normally preferred, but other inorganic oxidizing agents, such as lithium perchlorate, can also be used. The oxidizing agent is normally admixed with one or more materials to modify the burning characteristics of the composition and to afford energy enhancement. Such modifying materials include carbon black, ammonium oxalate, chromate compounds, lead salts, iron oxide, and also energizing agents such as aluminum and other low molecular weight metals, cyclonite, trinitrotoluene, nitroglycerin, nitroguanidine, guanidine nitrate, and the like. The matrix in which these particulate materials are suspended is generally a thermosetting composition that is cured in place after the grain has been cast. Compositions such as copolymers of butadiene with acrylic acid or acrylonitrile, polysulfides, polynitroalkyl or nitroalkenyl acrylates, nitrocellulose-plasticizer plastisol combinations, or the like, are preferably employed. Generally, the completed propellent charge consists of about 15% to 20% matrix and the remainder particulate solid material.

In order to further clarify the invention, following is a description of a preferred embodiment thereof with reference to the accompanying drawing in which:

FIGURE 1 is a longitudinal view partially in section of a rocket motor illustrating an embodiment of this invention;

FIGURE 2 is a cross sectional view taken along the line II—II of FIGURE 1; and

FIGURE 3 is a cross sectional view illustrating the detail of a supporting member.

As shown in the drawing, the motor is contained in a case 1 which is closed at one end and provided with a nozzle or exhause port 2 at the opposite end. A plurality of arcuate forms or inert slivers 3 of balsa wood are cemented about the internal surface of the case. The rocket motor is substantially filled with a propellent grain 4 having substantially the following formulation:

| | Percent |
|---|---|
| Ammonium perchlorate | 74 |
| Aluminum | 8 |
| Polybutadiene acrylic acid copolymer | 16.1 |
| Epon 562 curing agent | 1.9 |

The grain 4 is provided with a central perforation 5 extending throughout its length. A plurality of axially extending slots or valleys 6 radiate from the central perforation toward the periphery of the grain and divide the grain into radial segments 7. A plurality of supporting members or star supports 8 extend from the balsa wood inserts through each of the segments toward the central perforation 5. These star supports formed of phenol formaldehyde resin are affixed to the balsa wood slivers by press fitting them into holes previously formed in the wood. As best shown in FIGURE 3, the supporting members 8 have a generally elliptical cross sectional configuration with their major axis being substantially parallel to the longitudinal axis of the rocket motor assembly. Each of the supporting members is provided with a plurality of spines 9 about their periphery and along their entire length. The spines 9 are attached to the supporting rod by press fitting them into holes drilled into the rods. It will be readily appreciated, however, that the spines can also be bonded to the star supports in any suitable way or can be molded as an integral part of the support. When the propellent charge is cast in place, the supporting rods are completely imbedded in the charge. Also, the spines 9 on the supporting rod which are generally circular in cross section serve as positive anchoring means for the propellent charge and prevent deformation by cold flow regardless of the position of the rocket assembly during storage prior to use.

While the above embodiment depicts a rocket motor assembly provided with a metal case and a particular explosive charge, it is not to be inferred that this invention is limited to such details. On the contrary, the casing for the assembly, the supporting members, and the configuration of the central perforation can be modified in a great variety of ways that will readily present themselves to those skilled in the art. Thus, it is to be understood that the features of this invention can be advantageously applied to all types of rocket motors and gas generator assemblies utilizing a star point propellent.

Since various modifications within the spirit of this invention may be made within the specific embodiment, the detailed description is to be considered as illustrative and not limiting the invention except in accordance with the appended claims.

What is claimed is:

1. In a rocket motor comprising an outer casing having a gas outlet means and containing a propellent grain having a cross-sectional configuration of the star type, wherein the grain is divided into a plurality of radial segments positioned between the points of the star, the improvement which comprises a plurality of substantially inert supporting members extending radially from the casing through each of the segments of the grain toward the center of the grain, one end of each support member being secured to the casing and the remainder of the support member being embedded in the propellant grain, each supporting member being provided with a plurality of spines extending from the surface thereof.

2. In a rocket motor assembly comprising an outer casing having a gas outlet means, said outer casing containing a propellant grain having a cross-sectional configuration of the star type, wherein the grain is divided into a plurality of radial segments positioned between the points of the star and wherein one inert sliver is secured in each segment to the interior surface of said casing substantially parallel to the longitudinal axis of the grain and substantially equidistant from two adjacent star points, the improvement which comprises a plurality of substantially inert supporting members extending into each segment of the grain, one end of each supporting member being secured to an inert sliver and the remainder of the supporting member being embedded in the propellant grain, each suporting member being provided with a plurality of spines extending from the surface thereof.

(References on following page)

References Cited in the file of this patent

UNITED STATES PATENTS

| | | |
|---|---|---|
| 1,530,692 | Paulus | Mar. 24, 1925 |
| 1,670,689 | Olmstead | May 22, 1928 |
| 2,750,887 | Marcus | June 19, 1956 |
| 2,923,126 | Precoul | Feb. 2, 1960 |
| 2,939,396 | Adelman | June 7, 1960 |
| 2,987,882 | Nocke | June 13, 1961 |

FOREIGN PATENTS

| | | |
|---|---|---|
| 659,758 | Great Britain | Oct. 24, 1951 |
| 143,421 | Sweden | Dec. 22, 1953 |